(12) United States Patent
Engrand et al.

(10) Patent No.: US 11,067,144 B2
(45) Date of Patent: Jul. 20, 2021

(54) BRAKING SYSTEM FOR A HYDRAULIC MACHINE

(71) Applicant: POCLAIN HYDRAULICS INDUSTRIE, Verberie (FR)

(72) Inventors: Julien Engrand, Verberie (FR); Jean-Philippe Raisin, Verberie (FR); Stéphane Vidal, Verberie (FR); Aurélien Ulmer, Verberie (FR); Dominique Costaz, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 15/648,091

(22) Filed: Jul. 12, 2017

(65) Prior Publication Data
US 2018/0017117 A1    Jan. 18, 2018

(30) Foreign Application Priority Data
Jul. 13, 2016    (FR) ........................ 1656754

(51) Int. Cl.
*F16D 65/853*    (2006.01)
*F16D 55/40*    (2006.01)
(Continued)

(52) U.S. Cl.
CPC .............. *F16D 65/853* (2013.01); *F03C 1/00* (2013.01); *F03C 1/047* (2013.01); *F04B 1/047* (2013.01);
(Continued)

(58) Field of Classification Search
CPC .. F16D 55/40; F16D 2121/12; F16D 2121/06; F16D 2055/0058;
(Continued)

(56) References Cited

U.S. PATENT DOCUMENTS 2,837,181 A * 6/1958 Kelley .................... F16D 55/40
137/468
2,873,826 A * 2/1959 Werner ................... F16D 55/40
188/152
(Continued)

FOREIGN PATENT DOCUMENTS

| DE | 2331315 A1 * | 1/1975 | ........... F16D 13/648 |
| EP | 1072814 A1 | 1/2001 | |
| JP | 2002323072 A * | 11/2002 | |

OTHER PUBLICATIONS

French Preliminary Search Report dated Mar. 20, 2017, in French App. No. 1656754 (2 pages).

*Primary Examiner* — Bradley T King
*Assistant Examiner* — Stephen M Bowes
(74) *Attorney, Agent, or Firm* — The Webb Law Firm

(57) ABSTRACT

A hydraulic apparatus comprising a casing (1) having arranged therein a hydraulic machine (2), a shaft (4) mounted to rotate relative to the casing (1) by means of a bearing (5), a braking system (3) having a plurality of brake disks (31, 34) configured to prevent the shaft (4) rotating relative to the casing (1) in selective manner, and a control system (6, 7) for controlling said braking disks (31, 34), the hydraulic system including an irrigation system adapted to cool said brake disks (31, 34) by means of a fluid, the irrigation system including a fluid inlet (81) and a fluid outlet (82), the hydraulic system being characterized in that the fluid inlet and outlet (81, 82) of the irrigation system define a fluid flow within the casing in which the braking system (3) is downstream from the hydraulic machine (2).

10 Claims, 4 Drawing Sheets

(51) Int. Cl.
*F03C 1/047* (2006.01)
*F04B 53/08* (2006.01)
*F03C 1/00* (2006.01)
*F04B 1/047* (2020.01)
*F16D 65/12* (2006.01)
*F16D 65/02* (2006.01)
*F16D 65/78* (2006.01)

(52) U.S. Cl.
CPC .............. *F04B 53/08* (2013.01); *F16D 55/40* (2013.01); *F16D 65/127* (2013.01); *F16D 65/128* (2013.01); *F16D 2065/1332* (2013.01); *F16D 2065/783* (2013.01); *F16D 2065/789* (2013.01)

(58) Field of Classification Search
CPC ........... F16D 2055/0062; F16D 65/186; F16D 65/853; F16D 2065/782; F16D 13/52; F16D 13/70; F16D 13/72; F16D 13/74; F16D 25/062; F16D 25/063; F16D 25/0635; F16D 25/0638; F16D 7/027; F16H 61/47; F16H 61/431; F15B 15/262; F04B 1/328; F04B 1/326; F04B 1/324; F04B 1/322; F04B 1/32; F04B 1/295; F04B 1/28; F04B 1/22; F04B 1/141; F04B 1/0413; F04B 1/0408; F03C 1/0692; F03C 1/0686; F03C 1/0678; F01B 3/106; F01B 3/007; E02F 9/2296; E02F 9/2075; B66F 9/07572; B60W 10/188; B60W 10/182; B60W 10/103; B60T 1/062

USPC ... 188/218 XL, 264 R, 264 B, 264 D, 264 E, 188/264 F, 264 CC
See application file for complete search history.

(56) References Cited

U.S. PATENT DOCUMENTS

| | | | | | |
|---|---|---|---|---|---|
| 2,914,140 | A | * | 11/1959 | Werner | B60T 11/30 188/152 |
| 3,198,295 | A | * | 8/1965 | Fangman | F16D 13/648 188/152 |
| 4,624,353 | A | * | 11/1986 | Sailer | F16D 55/40 192/70.12 |
| 5,536,215 | A | * | 7/1996 | Shaffer | B60K 17/20 475/88 |
| 6,115,662 | A | * | 9/2000 | Sugano | B60T 17/221 701/29.5 |
| 6,543,222 | B1 | * | 4/2003 | Case | B60T 1/065 188/264 F |
| 8,155,834 | B2 | * | 4/2012 | Murahashi | B60B 11/06 701/36 |
| 2004/0132581 | A1 | * | 7/2004 | Gratzer | F16D 25/0638 477/166 |
| 2008/0006504 | A1 | * | 1/2008 | Sudau | F16D 13/648 192/113.36 |
| 2011/0214952 | A1 | * | 9/2011 | Fujino | B60T 5/00 188/264 B |
| 2011/0253488 | A1 | * | 10/2011 | Vidal | F16D 59/02 188/67 |
| 2013/0248303 | A1 | * | 9/2013 | Okuno | B60T 1/062 188/67 |
| 2015/0007556 | A1 | | 1/2015 | Kawabata | |

\* cited by examiner

BRAKING SYSTEM FOR A HYDRAULIC MACHINE

CROSS-REFERENCE TO RELATED APPLICATIONS

This patent application claims the benefit of priority under 35 U.S.C. § 119 to French Patent Application No. 1656754, filed on Jul. 13, 2016, the entirety of which is herein incorporated by reference.

GENERAL TECHNICAL FIELD

The present invention relates to the field of hydraulic machines, and more precisely to the brakes of hydraulic equipment.

STATE OF THE ART

Hydraulic systems such as hydraulic motors and pumps, referred to herein as "hydraulic machines", are commonly arranged in a casing that needs to be connected to a drain orifice in order to prevent potential pressure rises within the casing, as can result from hydraulic leaks inside the hydraulic machine. The hydraulic machine also needs to be cooled. Such hydraulic machines also usually include a braking system, which must also be cooled when in operation.

The term "hydraulic machine" is used to mean a hydraulic motor or a hydraulic pump, where such a machine is reversible.

In order to perform such cooling functions, a stream of oil is typically injected into the casing of the hydraulic machine in order to cool the braking system, which system is typically subjected to strong variations of temperature as a result of the friction that is applied during braking. The oil is subsequently redirected to the hydraulic machine in order to cool it and be discharged via the drainage orifice of the motor casing.

Nevertheless, such systems are not very satisfactory in terms of performance. Specifically, although the braking system is cooled effectively, the hydraulic machine itself receives additional heat via the oil coming from the braking system, thereby degrading the efficiency of the hydraulic machine.

In order to counter that problem, it has been envisaged to separate the circuit for cooling the braking system from the circuit for cooling/draining the hydraulic machine. Nevertheless, such a solution leads to a structure that is too complex and bulky, and is thus found to be of little application industrially, in particular since that type of configuration requires a greater number of hydraulic couplings.

The present invention thus seeks to counter these problems, at least in part.

SUMMARY OF THE INVENTION

To this end, the present invention provides a hydraulic apparatus comprising a casing having arranged therein a hydraulic machine, a shaft engaged in the casing and mounted to rotate relative to the casing by means of a bearing having at least two rolling elements, a braking system having a plurality of brake disks configured to prevent the shaft rotating relative to the casing in selective manner, and a control system for controlling said braking disks, the hydraulic system including an irrigation system adapted to cool said brake disks selectively by means of a fluid, the irrigation system including a fluid inlet and a fluid outlet, the hydraulic system being characterized in that the fluid inlet and outlet of the irrigation system define a fluid flow within the casing in which the braking system is downstream from the hydraulic machine.

In an example, the hydraulic machine is arranged in a first internal volume of the casing, and the braking system is arranged in a second internal volume of the casing defined between the two rolling elements of the bearing, the fluid inlet of the irrigation system being arranged in the first internal volume of the casing and the fluid outlet of the irrigation system being arranged in the second internal volume of the casing.

In an example, the fluid outlet of the irrigation system is connected to the internal volume of the casing via a channel arranged in the braking system.

The braking system control system thus typically includes at least one piston configured to apply a clamping force on the brake disks, said pistons including a hole so as to generate a passage for the fluid of the irrigation system from the internal volume of the casing towards the fluid outlet.

In an example, said hole is provided with a rated check valve configured to allow fluid to pass to the fluid outlet only when the pressure within the internal volume of the casing exceeds a threshold value.

In an example, the casing includes a gap configured to enable fluid to pass towards the fluid outlet via the hole and via a groove when the total thickness of a stack formed by the brake disks passes under a threshold value.

In an example, some or all of the brake disks are provided with linings presenting recesses forming passages for fluid of the irrigation system from the internal volume of the casing towards the fluid outlet.

In an example, some or all of the brake disks present linings formed by disjoint sectors, so as to leave portions having no lining, thereby forming passages for the fluid between two adjacent brake disks.

In an example, the system includes a pressure sensor within the casing, and configured to determine the pressure of the fluid of the irrigation system within the casing.

The pressure sensor is typically configured to deliver a signal when the pressure within the casing exceeds a threshold value.

By way of example, the pressure sensor is arranged within an internal volume of the casing including the hydraulic machine.

SUMMARY OF THE FIGURES

Other characteristics, objects, and advantages of the invention appear from the following description, which is purely illustrative and non-limiting, and which should be read with reference to the accompanying drawings, in which.

In all of the figures, elements that are in common are referenced by numerical references that are identical.

DETAILED DESCRIPTION

Figure 1:
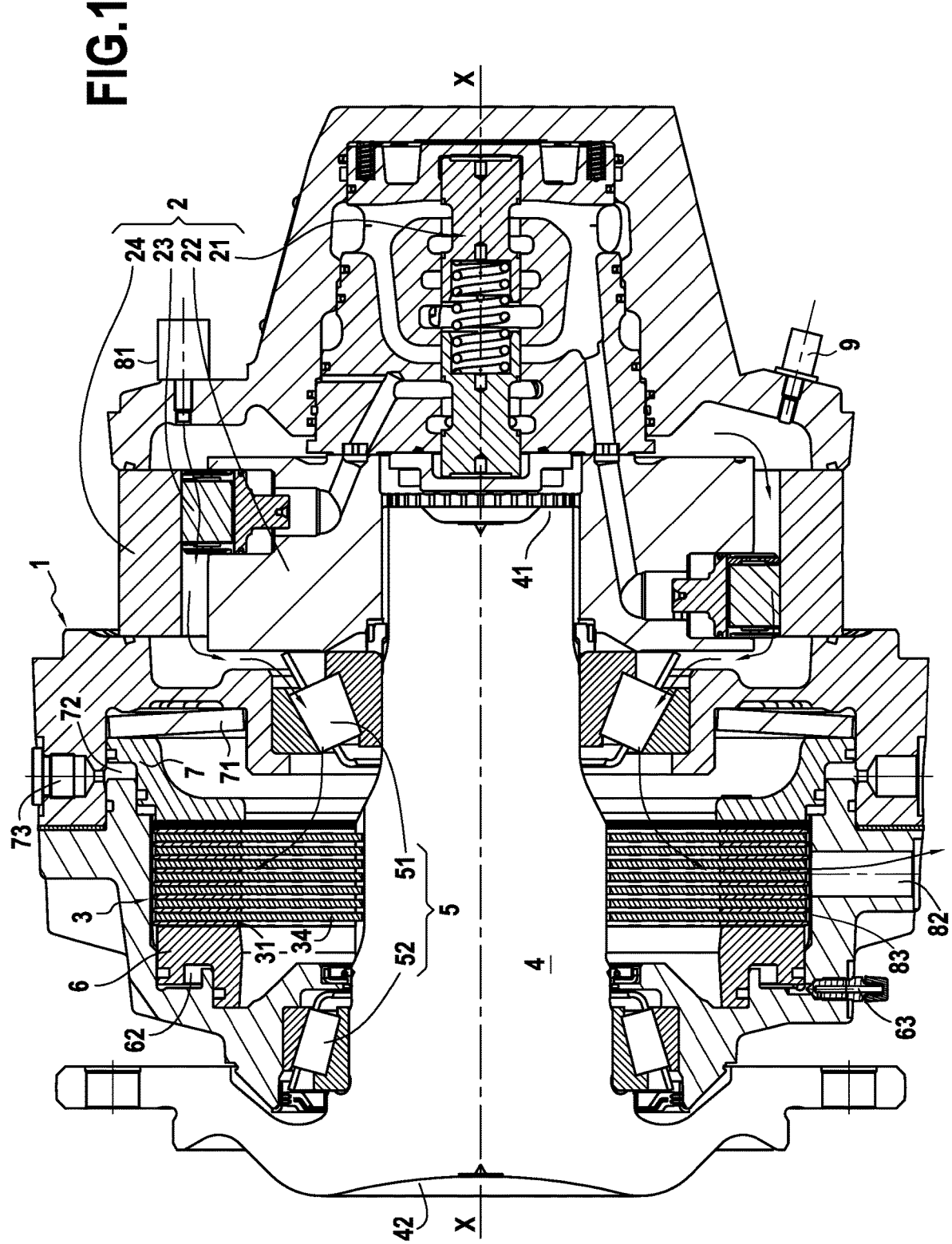
FIG. 1 is a diagrammatic section view of a system in an aspect of the invention.

FIG. 1 is a diagrammatic section view of an assembly in an aspect of the invention.

The figure shows an assembly comprising a casing 1 housing a hydraulic machine 2 and a braking system 3.

A shaft 4 is engaged in the casing 1 and is connected to the casing via a bearing 5 comprising two rolling elements. The shaft 4 defines an axis of rotation extending along a longitudinal direction X-X. A proximal end 41 and a distal end 42 of the shaft 4 are defined, the proximal end being the end closer to the hydraulic machine 2.

The casing 1 as shown includes a first internal volume in which the hydraulic machine 2 is housed.

In this example, the hydraulic machine 2 is a hydraulic machine having radial pistons, comprising a distributor 21, a cylinder block 22 in which pistons 23 are arranged facing a multi-lobe cam 24.

In this example, the multi-lobe cam 24 is formed by a portion of the casing 1. The cylinder block 22 is mounted stationary relative to the shaft 4, such that these two elements 22 and 4 are constrained together in rotation, e.g. by means of fluting. The distributor 21 is positioned to extend the proximal end 41 of the shaft 4.

In the embodiment shown, the hydraulic machine has a rotary shaft and a stationary cam. In a variant, the machine could have a rotary cam and a stationary shaft.

The structure of such a hydraulic machine is well known, and is not described in greater detail below.

More generally, in the present disclosure, the term "hydraulic machine" is used to designate the portion that serves to transform mechanical energy into hydraulic energy, or vice versa. With a hydraulic machine having radial pistons, that portion comprises the cylinder block, the pistons, and the multi-lobe cam. With a hydraulic machine having axial pistons, that portion comprises the cylinder block, the pistons, and a swashplate, typically with a variable angle of inclination.

The bearing 5 has two rolling elements 51 and 52, specifically two conical roller bearings that are spaced apart from each other in the longitudinal direction of the shaft 4. The rolling element 51 is thus referred to as the "proximal" rolling element 51, while the rolling element 52 is referred to as the "distal" rolling element 52. The space between the rolling elements 51 and 52 defines a second internal volume of the casing 1, which volume houses the braking system 3.

The braking system 3 comprises a plurality of brake disks 31 secured to the casing 1 and a plurality of brake disks 34 secured to the shaft 4, in particular by fluting or grooves. These brake disks 31 and 34 thus form a stack of brake disks.

The braking system also has two braking controls 6 and 7, that are configured in such a manner as to apply a compression force selectively against the brake disks 31 and 34 in order to control locking of relative rotary motion between the shaft 4 and the casing 1.

In the example shown, the two braking controls 6 and 7 are two opposite pistons arranged on opposite sides of the brake disks 31 and 34.

Each of these pistons 6 and 7 is controlled by a pressurizing chamber connected to pressure feed ducts with one pressurizing chamber associated with each piston, and formed by a part that is movable in translation along the longitudinal direction X-X and adapted to apply a compression force against the stack of brake disks. The brake disks 31 and 34 then serve to lock relative rotary motion between the shaft 4 and the casing 1 as a result of friction forces between the brake disks 31 and 34.

In the example shown, the piston 6 forms by way of example a service brake, while the piston 7 forms a parking brake. The parking brake is typically a brake that by default applies a braking force, with the action of the brake being neutralized when the system is put into service.

In the example shown, the piston 7 is coupled to a washer 71 tending to press the piston 7 against the stack of brake disks and thus tending to apply a braking force. A chamber 72 of the parking brake is connected to a pressure feed duct 73, and a rise in pressure in the chamber 72 tends to oppose the force exerted by the washer 71 and thus to move the piston 7 in such a manner as to move it away from the stack of brake disks.

Conversely, the service brake formed by the piston 6 has a service chamber 62 configured so that a rise in pressure inside this service chamber 62 causes a braking force to be applied against the stack of brake disks via the piston 6. The service chamber 62 is thus connected to a pressure feed duct 63. The service brake may be controlled by a user acting on a brake control.

As mentioned above, the hydraulic machine 2 requires both a discharge and cooling, and the braking system 3 requires cooling while in operation. Friction between the disks of the braking system 3 can give rise in particular to a considerable rise in temperature, thus requiring high-performance cooling in order to ensure good operation of the braking system 3.

In order to provide such cooling, the system as described includes an irrigation system adapted to establish a flow of fluid, e.g. oil, through the casing 1, thus performing both a function of cooling the braking system 3 and also a function of cooling and discharging oil from the hydraulic machine 2.

The irrigation system has an inlet 81 and an outlet 82 adapted respectively to inject fluid into the casing 1 and to extract fluid from the casing 1.

As shown diagrammatically in FIG. 1, the inlet 81 and the outlet 82 are formed in the casing 1 in such a manner that the inlet 81 injects fluid into a first internal volume of the casing 1 that contains the hydraulic machine 2, while the outlet 82 takes fluid from a second internal volume of the casing 1 that contains the braking system 3, these two internal volumes being separated by the proximal rolling element 51 of the bearing 5. It can readily be understood that the proximal rolling element 51 does not provide fluid-tight separation between the two internal volumes of the casing 1 and that fluid can thus pass between the first internal volume of the casing 1 and the second internal volume of the casing 1.

This configuration of the irrigation system, and more precisely the locations of the inlet 81 and of the outlet 82 of the irrigation system serve to define the flow direction of the fluid through the casing 1, which passes initially through the hydraulic machine 2, and then passes through the proximal rolling element 51 prior to reaching the braking system 3, and then being discharged from the casing 1 via the outlet 82. The flow direction of the fluid through the casing 1 is thus shown diagrammatically in FIG. 1 by means of arrows.

The fluid, e.g. oil, can then be recycled by passing through a filter and/or cooling system prior to being reinjected via the inlet 81.

The outlet 82 is shown in this example as being on a side that is radially opposite the side of the inlet 81, i.e. there is a phase shift of 180° between them about the axis X-X of the machine. In a variant, the outlet 82 could be on the same side as the inlet 81 (no phase shift). It is possible to envisage any phase shift without going beyond the ambit of the invention.

The requirements of the hydraulic machine 2 and of the braking system 3 are different: the hydraulic machine 2 requires oil to be discharged and cooling while it is in operation, while the braking system specifically requires a large amount of heat to be dissipated.

This configuration of the irrigation system thus makes it possible initially to discharge oil and cool the hydraulic machine 2, and subsequently to cool the braking system 3.

In this way, the fluid passing through the hydraulic machine 2 has a temperature that can be controlled, and it is not carrying heat coming from the braking system 3. The efficiency of the hydraulic machine is therefore not degraded.

Such operation is advantageous compared with conventional irrigation systems in which the fluid is injected so as to begin by cooling the braking system and subsequently the hydraulic machine, thereby leading to a degradation in the performance of the hydraulic machine since heat is transferred thereto by the fluid that has previously cooled the braking system.

It can be understood that in order to reach the outlet 82 of the irrigation system, the fluid therefore needs to pass through the braking system 3.

However, it has been observed that during braking, and thus when the brake disks 31 and 34 of the stack of disks in the braking system 3 are clamped against one another, and in particular when the linings of the brake disks are worn, there is a risk that the fluid of the irrigation system no longer discharges correctly, thereby leading to a rise of pressure within the casing 1, which is prejudicial to proper operation of the hydraulic machine 2.

For this purpose, the brake disks 31 and 34 are typically provided with linings that present grooves formed in the side surfaces of the brake disks, thus forming ducts for passing the fluid.

Figure 2:
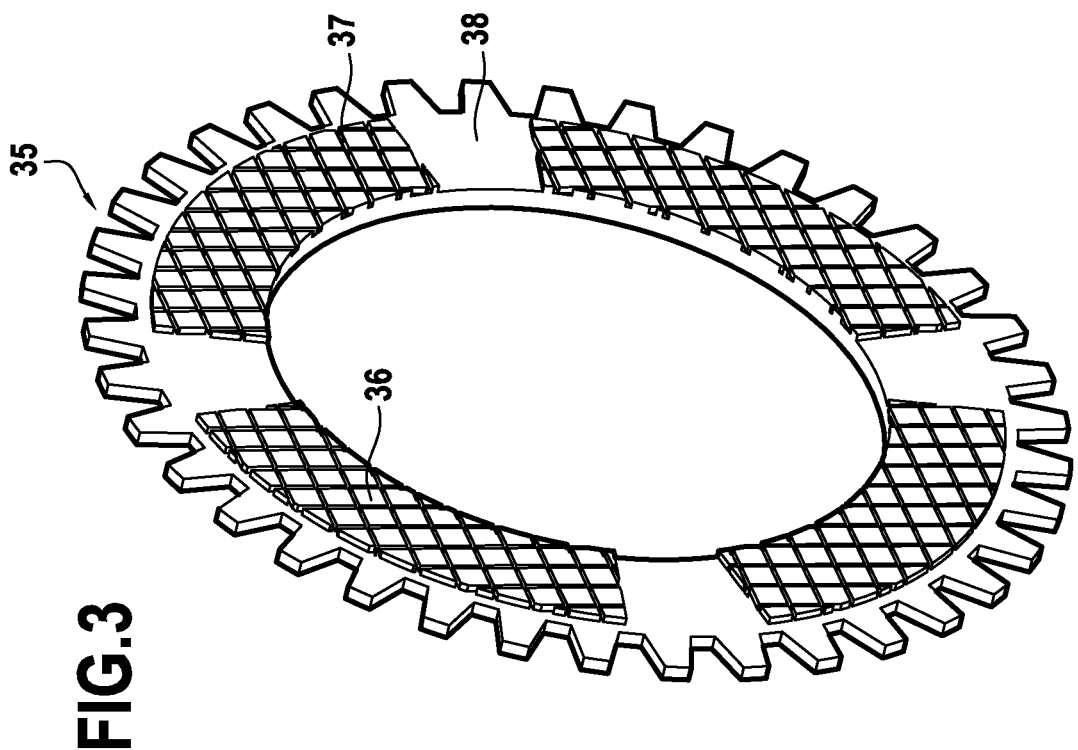
FIGS. 2 and 3 show two embodiments of brake disks of such a system.

FIG. 2 thus shows an example of a brake disk 35 provided with such a lining 36 that, in this example, presents grooves 37 forming a rectangular grid, thereby defining a plurality of ducts for allowing fluid to pass through a stack of brake disks. Some or all of the brake disks linked to the casing 1 or linked to the shaft 4 may thus present such a lining 36. In a variant, the lining 36 may include radial ducts, or circularly arcuate ducts opening out at inner and outer radial ends of the lining 36 so as to enable the stream of fluid to flow radially towards the outlet 82 during braking.

Figure 3:
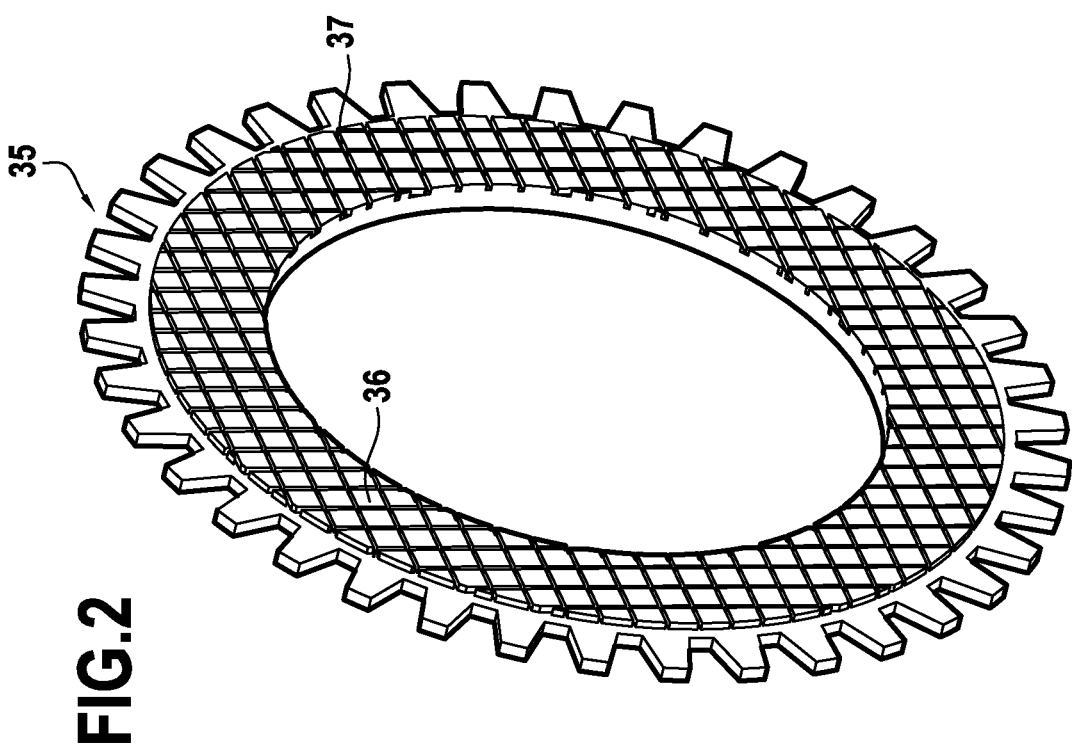

FIG. 3 shows another example of a brake disk 35 in which the lining 36 is made up of disjoint, or gapped, segments, so as to leave portions 38 without any lining, thereby forming passages for the fluid between two adjacent disks. Some or all of the brake disks linked to the casing 1 or linked to the shaft 4 may thus present such a lining 36. The lining portions 36 may also have grooves 37 as shown above with reference to FIG. 2.

The various embodiments of brake disks shown with reference to FIGS. 2 and 3 may be used separately or in association within a single braking system 3.

Figure 4:
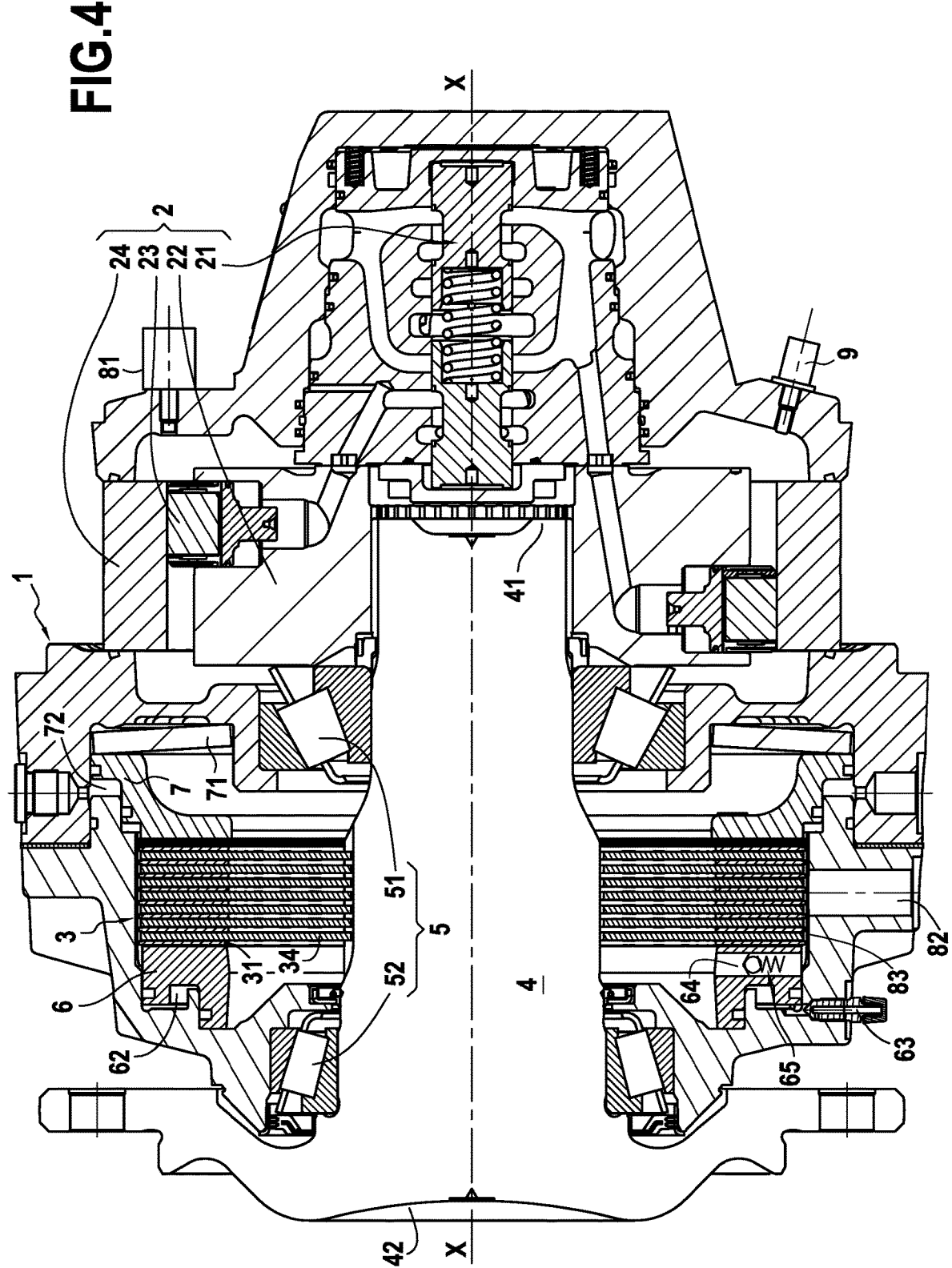
FIGS. 4 and 5 are two views showing variants of such a system.

FIG. 4 is a section view of another embodiment serving to provide good fluid flow for the irrigation system, even when the brake disks are clamped together.

In this embodiment, a hole 64 is made in the piston 6 of the service brake. This hole connects the internal volume of the casing 1 to the outlet 82 of the irrigation system, e.g. via a groove 83 formed in the casing 1. The chamber 62 associated with the piston 6 is itself isolated from the hole 64.

The hole 64 formed in the piston 6 is typically provided with a rated check valve 65 adapted to allow fluid to pass only from the internal volume of the casing towards the outlet 82 and only when the pressure within the internal volume of the casing 1 exceeds a threshold value. In a variant or in addition, the hole 64 may be of small diameter, so as to act as a hydraulic constriction.

In a variant that is not shown in the figures, a hole is formed in the piston 7 of the parking brake. Operation is then similar to the operation described above with reference to FIG. 4; the hole is connected to the outlet 82 of the irrigation system via a groove 83 formed in the casing 1. The chamber 72 associated with the piston 7 is itself isolated from the hole.

The hole formed in the piston 7 is typically provided with a rated check valve (not shown in FIG. 5) adapted to allow fluid to pass only from the internal volume of the casing towards the outlet 82, and only when the pressure within the internal volume of the casing 1 exceeds a threshold value. In a variant or in addition, the hole may be of small diameter, so as to operate as a hydraulic constriction.

Figure 5:
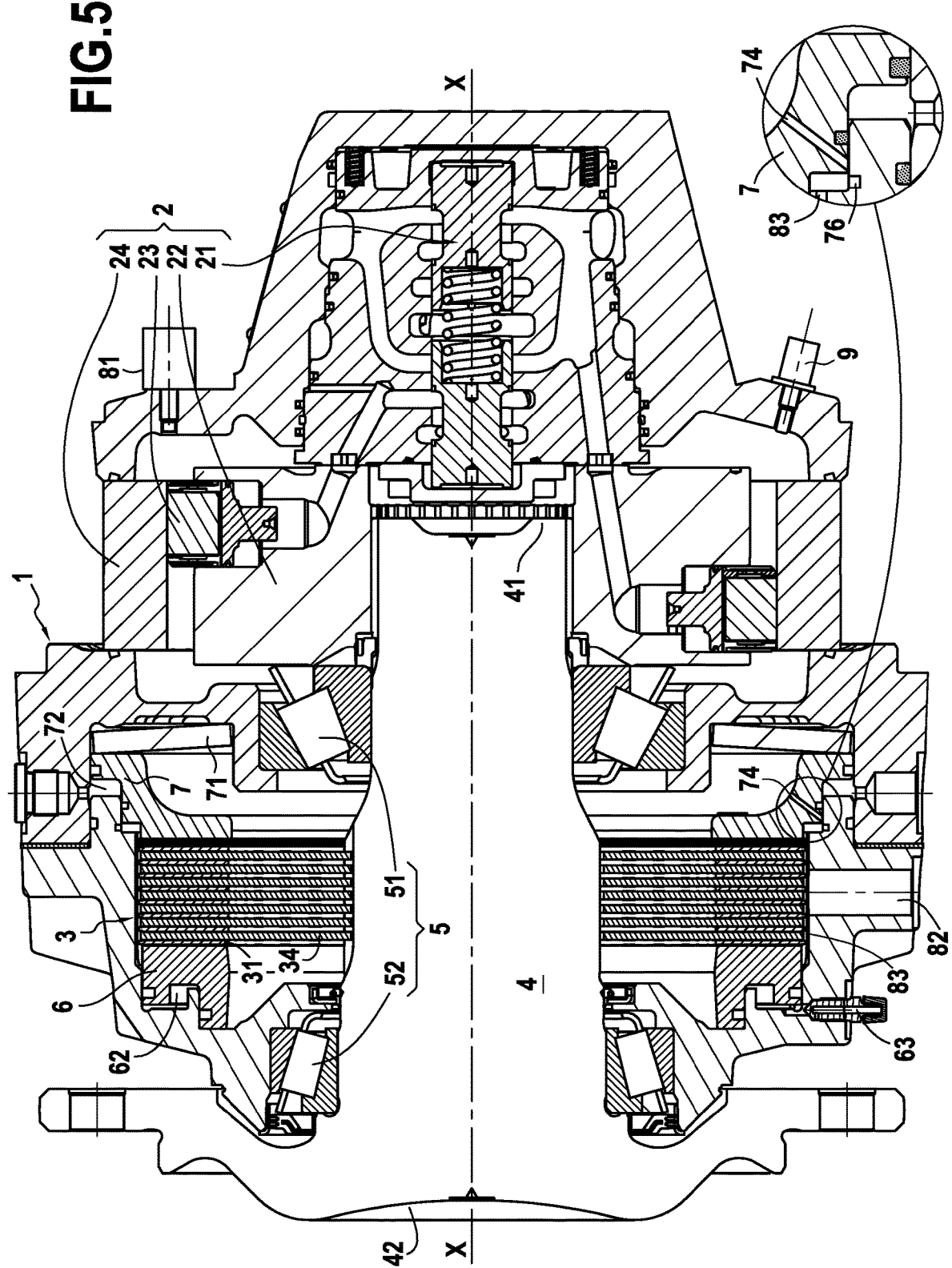

FIG. 5 shows a particular embodiment of this variant, in which the hole 74 made in the piston 7 of the parking brake is connected to the groove 83 via a gap 76 formed in the casing 1.

This gap 76 is formed in the casing 1 so as to be in fluid flow communication with the hole 74 only when the piston 7 is in a given configuration.

More precisely, with reference to the embodiment shown in FIG. 5, the gap 76 is in fluid flow communication with the hole 74 only when the piston 7 has gone beyond a given position in its movement towards the brake disks 31 and 34. Specifically, movement of the piston 7 in this direction is the result in particular of wear of the brake disks 31 and 34. Specifically, wear of the brake disks decreases the thickness of the linings of the brake disks, and thus the total thickness of a stack formed by the brake disks 31 and 34. Consequently, in the braking position, the piston 7 is to be found in a position that is axially offset relative to an equivalent position for "new" brake disks.

However, wear of these brake disks, i.e. wear of the linings of the brake disks, has the effect of reducing the section of the ducts for passing fluid that are formed in the linings of the brake disks, thereby having the effect of increasing the pressure within the internal volume of the casing 1.

Furthermore, this embodiment makes it possible to vary progressively the distribution of streams between the stream passing through the brake disks 31 and 34 and the stream passing through the hole 74. Specifically, the progressive movement of the piston 7 towards the stack of brake disks causes the flow section between the hole 74 and the gap 76 to increase progressively, thereby progressively increasing the stream of fluid passing via the hole 74 in order to reach the outlet 82.

By way of example, the gap 76 and the hole 74 may be made so as to be in fluid flow communication only once the brake disks 31 and 34 have reached a certain level of wear, a level from which the flow of fluid provided via the brake disks (as described for example above with reference to FIGS. 2 and 3) no longer provides a sufficient fluid flow rate.

These various embodiments shown in FIGS. 2 to 5 thus make it possible to ensure good fluid flow for the irrigation circuit, even in the event of the brake disks becoming worn, and thus to avoid a rise of pressure within the casing 1.

These various embodiments shown in FIGS. 2 to 5 may be combined within a single system or they may be used in isolation.

The casing 1 is typically provided with a pressure sensor 9 such as an oil pressure switch arranged in its internal volume, e.g. in the internal volume of the casing 1 containing the hydraulic machine 2.

By way of example, this pressure sensor 9 is positioned in a dedicated orifice of the casing 1, at the distributor portion, as shown diagrammatically in FIG. 1.

The pressure sensor 9 is sensitive to the pressure within the internal volume of the casing 1, and thus the pressure of the fluid of the irrigation system within the internal volume of the casing 1.

Such a pressure sensor 9 serves to ensure proper operation of the irrigation system, and thus avoid excessive pressure within the casing 1.

Such a pressure sensor is particularly advantageous when the passage of fluid from the irrigation system through the braking system takes place via linings provided with channels as described above with reference to FIGS. 2 and 3, for example.

Specifically, in such embodiments, it can be understood that wear of the linings 36 leads to a reduction in the section of the channels formed by the grooves 37 and thus to a potential rise of pressure within the internal volume of the casing 1.

The pressure sensor 9 positioned upstream from the braking system in the flow direction of the fluid of the irrigation system thus serves to detect such a rise in pressure within the internal volume of the casing 1 and can therefore perform a function of detecting or monitoring the wear of the linings 36 of the brake disks.

The pressure sensor 9 can thus be configured in such a manner as to deliver a signal to the user when the pressure within the internal volume of the casing 1 exceeds a pressure threshold value, thereby informing the user that the linings 36 of the brake disks need to be replaced. By way of example, the pressure threshold value is selected as being a pressure value corresponding to a determined level of wear of the brake disks 31 and 34 such that the parking brake function can still be performed, i.e. the wear of the brake disks 31 and 34 is less than the wear of the brake disks at which the piston 6 of the parking brake comes into abutment against a shoulder of the casing, thereby leading to a loss of the parking brake function.

Such a pressure sensor 9 may also be advantageous in other embodiments, making it possible more generally to detect a fault in the discharge of the fluid of the irrigation system.

The invention claimed is:

1. A hydraulic apparatus comprising a casing having arranged therein a hydraulic machine, a shaft engaged in the casing and mounted to rotate relative to the casing by means of a bearing system having at least two rolling elements, a braking system having a plurality of brake disks configured to prevent the shaft rotating relative to the casing in selective manner, and a control system for controlling said braking disks, an irrigation system adapted to cool said hydraulic machine and said brake disks by means of a fluid, the irrigation system including an irrigation fluid inlet and an irrigation fluid outlet, wherein the irrigation fluid inlet and irrigation fluid outlet of the irrigation system define a fluid flow within the casing in which the braking system is downstream from the hydraulic machine, wherein the casing of the hydraulic machine is arranged in a first internal volume, and the braking system is arranged in a second internal volume defined between the two rolling elements of the bearing system, the irrigation fluid inlet of the irrigation system being arranged in the first internal volume of the casing and the irrigation fluid outlet of the irrigation system being arranged in the second internal volume of the casing, so that the flow of fluid of the irrigation system first passes through the hydraulic machine, and the same flow of fluid then continues through the braking system, the flow of fluid within the casing being subjected to a casing pressure, and wherein the braking system further includes two opposing pistons arranged on opposite sides of brake disks and each piston is controlled by a brake fluid flow from separate pressurizing chambers, with one pressurizing chamber associated with each piston, wherein the brake fluid flow is connected to pressure feed ducts separate from the fluid flow associated with the irrigation fluid inlet and the irrigation fluid outlet, wherein the irrigation fluid flow and the brake fluid flow may occur simultaneously.

2. The hydraulic apparatus according to claim 1, wherein the fluid outlet of the irrigation system is connected to an internal volume of the casing via a channel arranged in the braking system.

3. The hydraulic apparatus according to claim 2, wherein some or all of the brake disks are provided with linings presenting recesses forming passages for fluid of the irrigation system from the internal volume of the casing towards the fluid outlet.

4. The hydraulic apparatus according to claim 2, wherein some or all of the brake disks present linings formed by disjoint sectors, so as to leave portions having no lining, thereby forming passages for the fluid between two adjacent brake disks.

5. The hydraulic apparatus according to claim 2, wherein at least one of the pistons of the braking system control system is configured to apply a clamping force on the brake disks, said at least one piston including a hole so as to generate a passage for the fluid of the irrigation system from the internal volume of the casing towards the fluid outlet.

6. The hydraulic apparatus according to claim 5, wherein said hole is provided with a rated check valve configured to allow fluid to pass from the internal volume of the casing to the fluid outlet when the pressure within the internal volume of the casing exceeds a threshold value.

7. The hydraulic apparatus according to claim 5, wherein the casing includes a gap configured to enable fluid to pass towards the fluid outlet via the hole and via a groove when the total thickness of a stack formed by the brake disks passes under a threshold value.

8. The hydraulic apparatus according to claim 1, including a pressure sensor within the casing, and configured to determine the pressure of the fluid of the irrigation system within the casing.

9. The hydraulic apparatus according to claim 8, wherein the pressure sensor is configured to deliver a signal when the pressure of the fluid of the irrigation system within the casing exceeds a threshold value.

10. The hydraulic apparatus according to claim 8, wherein the pressure sensor is arranged within an internal volume of the casing including the hydraulic machine.

* * * * *